Figure 1:
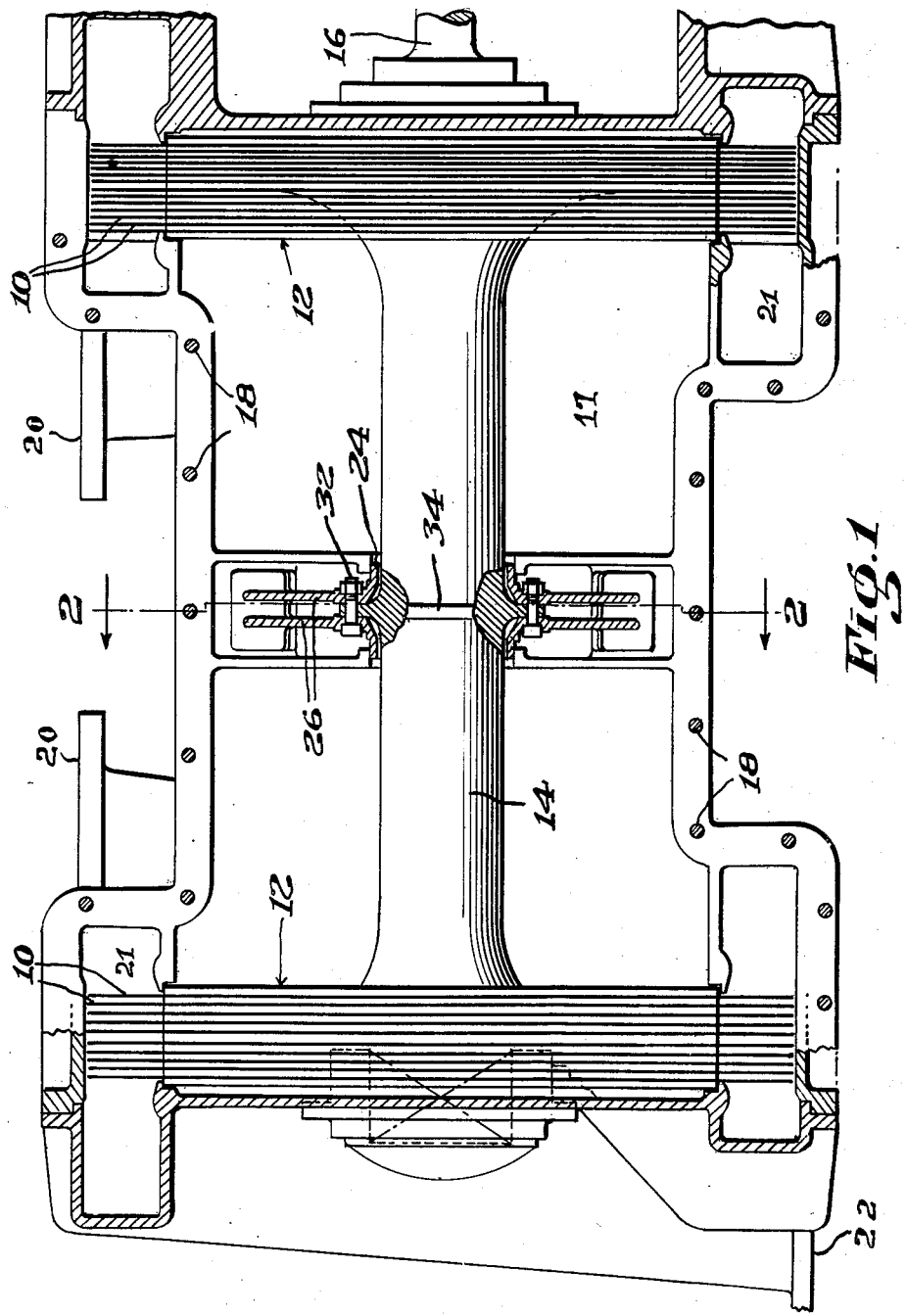

Jan. 13, 1953 G. C. SEAVEY 2,625,379
FIRST-MODE TORSIONAL VIBRATION DAMPER
Filed Nov. 3, 1950 2 SHEETS—SHEET 1

INVENTOR.
Gordon C. Seavey
BY
Gv. R. Hulbert
ATTORNEY

Jan. 13, 1953  G. C. SEAVEY  2,625,379
FIRST-MODE TORSIONAL VIBRATION DAMPER
Filed Nov. 3, 1950  2 SHEETS—SHEET 2

INVENTOR.
Gordon C. Seavey
BY
W. R. Hulbert
ATTORNEY

Patented Jan. 13, 1953

2,625,379

UNITED STATES PATENT OFFICE 2,625,379

FIRST-MODE TORSIONAL VIBRATION DAMPER

Gordon C. Seavey, Arlington, Mass., assignor to Sonic Research Corporation, Boston, Mass., a corporation of Massachusetts Application November 3, 1950, Serial No. 193,917

3 Claims. (Cl. 259—4)

This invention relates to improvements in machines having two-mass systems coupled for torsional oscillation during normal operation of the machines.

It is a general object of the invention to provide damping means to limit the amplitude of first-mode torsional oscillation in a system composed of two masses coupled by a torsion shaft and excited by torsional oscillations of one end of another torsional shaft coupled to one of the masses.

It is a specific object of the invention to provide such damping means in a form suited for use with machines for the application of alternating shear at sonic frequencies to the treatment of material which include a spring-driven two-mass spring coupled system arranged for torsional oscillation, as disclosed in copending application, Serial No. 129,786, filed November 28, 1949, jointly by me and Caperton B. Horsley, now Patent No. 2,584,053.

The invention is featured by the provision of means for limiting first-mode torsional vibration of a spring-driven two-mass spring coupled system arranged for torsional oscillation comprising a member rigidly connected to the system near a nodal point thereof and having a portion extending outwardly from the torsional axis, and fixed damping means disposed in such a way as to limit the amplitude of motion of the outwardly extending portion.

In a specific embodiment of the invention having mounted in a housing a main torsion bar carrying a drum and pulp treating members at each end and arranged for torsional oscillation at a sonic frequency with the drums vibrating out of phase with each other and excited by a second and weaker torsion bar, the rigid member is attached at or near the nodal point of the main torsion bar and has its ends extending on either side thereof away from the torsional axis. The ends of such member are provided with striking surfaces and the housing mounts internal bumpers cooperating with the striking surfaces to limit the motion of said member and bar in first-mode vibration. Preferably either the bumpers or the striking surfaces are composed of resilient cushioning material to cushion any impacts therebetween.

Figure 2:
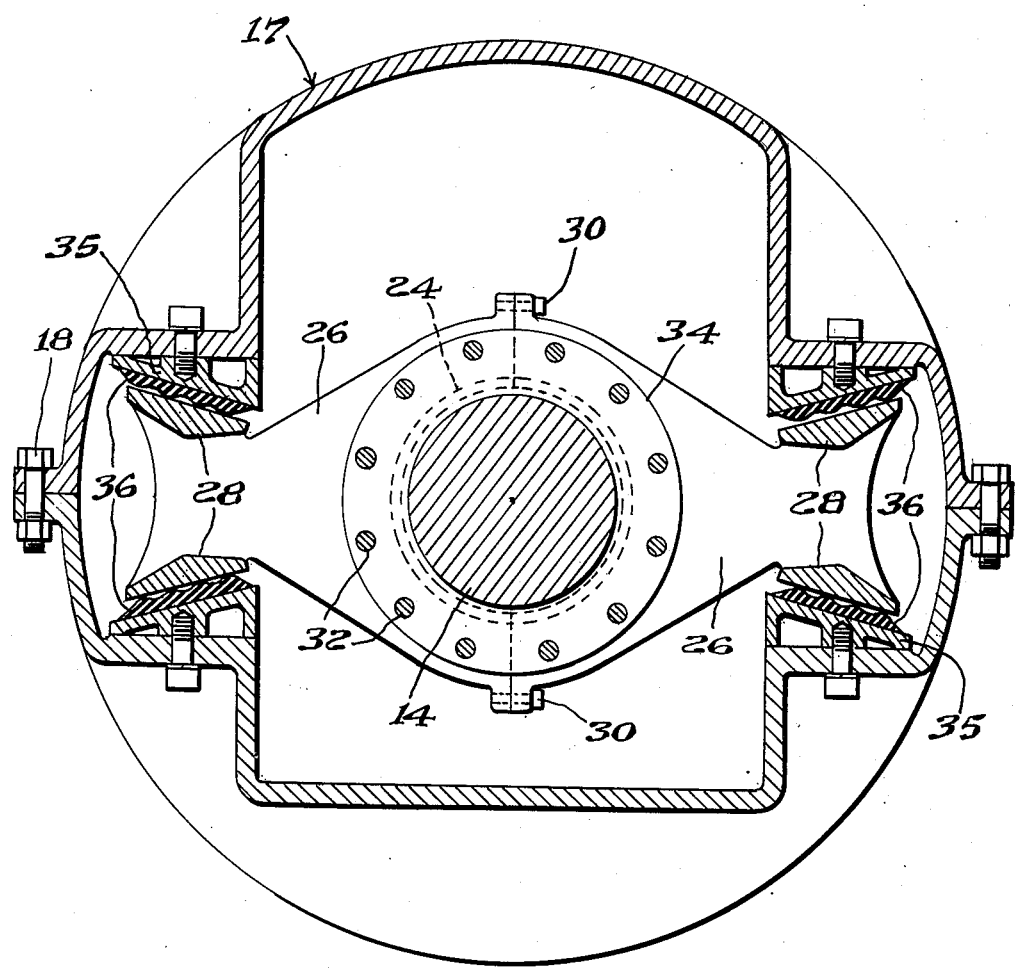

These and other objects, features and advantages of the invention will be more fully understood and appreciated from the following description of a preferred embodiment of the invention selected for purposes of illustration only and shown in the accompanying drawings, in which:

Fig. 1 is a fragmentary cross-sectional view of a machine for treating material with alternating shear and including a first-mode vibration damper according to the present invention; and Fig. 2 is a view taken along line 2—2 of Fig. 1 showing in greater detail the damping device of the invention.

In the course of developing machines for treating materials with alternating shear forces, it has been necessary to devise mechanically driven means for imparting a shearing action to the material. One such device, embodying a two-mass system spring coupled for torsional oscillation at one of its resonant frequencies, is that shown in Fig. 1 and described more fully in the copending application above referred to.

As shown in Fig. 1, two series or piles of annular blades 10 constituting pulp treating members and optionally provided with teeth are attached to drums 12 which are in turn fastened at opposite ends of a shaft 14 which is mounted to allow for torsional oscillation in conventional means such as roller bearings. To one end of the principal torsion bar 14 there is fastened a thinner extension shaft 16 which communicates with driving means (not shown) arranged to impart torsional oscillation to the shaft 16, and which shaft 16 is in essence a relatively weak torsional spring serving as a spring drive.

In operation, as the driving means is started, the end of extension shaft 16 which is attached to the driving means is caused to oscillate torsionally, and this twist is transmitted along the driving shaft 16 to the main torsional shaft 14, and acts as a torsional stimulus to the two-mass system composed of the drums 12 and the disks 10, which are spring coupled by the resilient shaft 14.

As the driving means continues to operate, and as the shaft 16 continues to impart an oscillatory torsional stimulus to the two-mass system, this system will be set into torsional oscillation at the operating frequency of the driving means. In the preferred embodiment of this device, the operating frequency is chosen as that frequency at which the two masses—drums and disks—will oscillate out of phase with each other, and which is a resonant frequency of the system. In this way, amplitude of motion is maintained without excessive torsional loads being applied to the driving means. Due to the resonant characteristics of the spring-driven system, the only power which need be supplied by the driving means is that required to compensate for frictional and damping losses inherent in the system.

Loads on the bearings of the drive mechanism are, therefore, kept to a minimum during operation by relying upon the resonant characteristics of the system. Loads which would otherwise be imposed on the bearings during starting and stopping are kept low by virtue of the fact that the difference in amplitude of motion between the driving means and the two-mass system is taken up by torsional flexing of the relatively thin torsional shaft 16.

This entire apparatus for treating materials with alternating shear forces imparted by the motion of the disks 10 is mounted in a housing 17 which is cast in two pieces for convenience, and bolted together with a series of machine bolts 18. Fluid material to be treated flows into the machine through inlet passages 20, into heading chambers 21, perpendicularly through the toothed disks 10, and out through outlet passages 22. The whole unit may be mounted by any conventional means.

One difficulty in operating such a machine, the solution of which is an object of the present invention, may now be described more readily. In the course of starting or stopping the machine, that is, when approaching or receding from the chosen operating frequency, the system must pass through resonance in its first mode of vibration. In this mode, both disk piles oscillate in phase with one another, and nearly all of the torsional deflection due to this motion takes place in shaft 16. This first mode is approximately the mode of vibration of a single mass equivalent to the combined masses of disks, drums and shaft 14 oscillating torsionally against the restoring force of the extension shaft 16. Since the first-mode resonance occurs at a lower frequency than the second mode, the amplitude of the disk oscillation must reach significantly greater values than for the second mode before the power absorbed limits the amplitude of oscillation.

Such a situation results in excessive torsional loads on the extension driving shaft 16, as well as on the driving means, and since there is no internal compensation in the first mode, there is excessive vibration apparent external to the machine. It would, therefore, be possible to fracture the shaft 16 or damage the driving mechanism if first-mode vibration were not inhibited enough to allow the machine to build up speed to the desired second mode of vibration.

To overcome this difficulty, I have invented means for damping the first mode of vibration, which means is shown in a preferred embodiment in Fig. 1, in place on a treating machine, and is shown in end view in Fig. 2.

As shown, the vibration damper consists of two half-cylindrical hubs 24 each with two arms 26 extending perpendicularly to the axis of the hubs 24. The arms are joined at their outer ends by thickened plates 28, which extend beyond the arms both radially and axially with respect to the axis of the hubs 24, and which plates 28 are roughly rectangular in plan view. The two cast pieces each comprising a hub 24, two arms 26 and two plates 28 are arranged to be fastened together with machine screws 30 about the torsion shaft 14, and further secured thereto by bolts 32 passing through appropriate holes in a flange 34 extending peripherally around shaft 14.

The flange 34 is located midway along the shaft 14, which is approximately the point of minimum torsional oscillation of the shaft during the desired second mode of vibration when spring 16 is weaker than spring 14. As shown more clearly in Fig. 1, the hub members 24 ride clear of the shaft except at the flange, and therefore do not impose any frictional resistance to the shaft's deflection in the second mode. It is obvious that if the two masses of the system are of unequal weight, the point of minimum torsional oscillation or nodal point will not be midway along the coupling shaft, but will be closer to the larger mass, in which case the apparatus of the invention would be applied at that point.

The housing 17 of the treating machine is recessed as shown in Fig. 2 to receive more readily the wedge-shaped members 35 having bumper surfaces covered with bumper pads of corrugated resilient damping material 36 arranged in spaced relation to the striking surfaces of plates 28. The members 35 are secured to the inner surface of the housing 17 by any conventional means.

Operation of the vibration damper as herein described during starting and stopping of the treating machine may be described as follows: If the two-mass system of drums, disks and shaft begins to undergo first-mode oscillation with increasing amplitude, the shaft 14 will impart torsional oscillatory motion to the arms 26 and the plates 28. When this motion has built up far enough, the plates will begin to strike the bumper pads 36 and the motion will be inhibited.

If the rate of build-up to operating speed is sufficiently high, the machine may go past the frequency of first-mode oscillation without experiencing any appreciable amplitude in that mode. In such a case, the plates 28 might not strike the bumper pads 36 at all, or might only require small damping such as that provided by deformation of the surface corrugations of the pads 36. However, if the rate of speed build-up of the machine is low, and if first-mode amplitudes are high, the plates 28 will tend to strike the bumper pads 36 with more force, and the greater restraining action of the whole pad would be required.

Torsional deflection in the first mode is thus restrained by the vibration damper of the present invention, with restraint being applied on a scale consistent with demand, but with a definite upper limit, and loads on the bearings of the machine drive mechanism are kept within desirable limits.

It will be understood that the invention is not limited in its scope to the preferred embodiment described herein, but the apparatus is effective in general for limiting the amplitude of first-mode vibration in two-mass systems such as that described. It will be understood from this that the present invention may be modified in several of its details without departing from the spirit thereof. Thus, for example, the arms 28 might be changed in number or connected through hydraulic dampers to the frame of the machine 17, or other such modifications may be made in a manner which would be readily apparent to those skilled in the art.

Having thus described my invention, what I claim as new and desire to secure by Letters Patent is:

1. In apparatus for treating material with intense alternating shear forces at a predetermined operating frequency, the combination comprising a pair of members each of predetermined mass, at least one of said members having a treating surface adapted to contact said material, an elastic member connecting said first named members to each other to transmit motion from one to the other, the elasticity of said connecting member being correlated with the masses of said first named members to constitute therewith a system having a predetermined natural frequency of oscillation corresponding to said operating frequency with said first named members oscillating with predetermined amplitudes at the same frequency but in opposite phase and with a nodal point in said connecting member between said first named members, said system being subject during starting and stopping to oscillation in a first-mode of vibration at a frequency lower than said operating frequency in which mode said members and elastic connection oscillate substantially in phase with each other, resilient coupling means connected to one of the members of said system, mechanism for oscillating said coupling means at said operating frequency whereby to bring said system into oscillation at said frequency, means for presenting material to be treated to said treating surface, and a device for limiting said first-mode vibration, said device comprising a member rigidly connected to said elastic connecting member at said nodal point and having a portion extending outwardly from the axis of oscillation and resilient damping means arranged to engage and limit the movement of said outwardly extending portion for limiting the amplitude of oscillatory motion of the members of said system in both directions during said first-mode vibration.

2. In apparatus for treating fluent materials with alternating shear forces at a predetermined operating frequency, the combination which comprises a pair of members each of predetermined mass, a torsion bar connecting said members to each other, the masses of said members being so chosen having regard to the elasticity of said torsion bar that said members and bar together will constitute a resonant system having a predetermined natural frequency of torsional oscillation corresponding to said operating frequency with said members oscillating with predetermined amplitudes at the same frequency but in opposite phase and with a nodal point in said bar, but said system being subject during starting and stopping to oscillation in a first-mode of vibration at a frequency lower than said operating frequency in which said members and bar oscillate substantially in phase with each other, a housing enclosing at least one of said members, an inlet and outlet in said housing permitting the flow therethrough of said material to be treated, material-contacting elements extending from the enclosed member for oscillation therewith, a resilient exciter connection in driving relation to one of the members of said system and having substantially less elastic strength than said torsion bar, a driving device for oscillating said exciter connection at said operating frequency, and a device for limiting said first-mode torsional vibration of said system, said device comprising a member rigidly connected to said torsion bar at said nodal point and having a portion extending outwardly from its axis and resilient damping means arranged to engage and limit the movement of said outwardly extending portion to limit the amplitude of oscillatory motion of the members of said system in both directions during such first-mode vibration.

3. Apparatus in accordance with claim 2 in which said resilient damping means comprises cooperating sets of bumpers attached to said outwardly extending portion and an adjacent portion of said housing and resilient cushioning members for cushioning the impact therebetween.

GORDON C. SEAVEY.

REFERENCES CITED

The following references are of record in the file of this patent:

UNITED STATES PATENTS

| Number | Name | Date |
| --- | --- | --- |
| 1,122,682 | Butts | Dec. 29, 1914 |
| 1,766,899 | Griswold | June 24, 1930 |
| 1,773,745 | Nacker | Aug. 26, 1930 |
| 1,996,104 | Forte | Apr. 2, 1935 |
| 2,368,334 | Tyler | Jan. 30, 1945 |

OTHER REFERENCES

Mack et al., "A Laboratory Manual of Elementary Physical Chemistry," 2d Edition, 1934, page 99.